United States Patent [19]

Bacon, Jr. et al.

[11] Patent Number: 4,943,139
[45] Date of Patent: Jul. 24, 1990

[54] SPOKED WHEEL REFLECTOR EMPLOYING ENCAPSULATED RETROREFLECTIVE TUBING

[75] Inventors: Chester A. Bacon, Jr.; James C. Coderre, both of Saint Paul, Minn.

[73] Assignee: Minnesota Mining and Manufacturing Company, St. Paul, Minn.

[21] Appl. No.: 246,217

[22] Filed: Sep. 19, 1988

[51] Int. Cl.$^5$ .......................... G02B 5/128; B60B 7/00
[52] U.S. Cl. ................................. 350/105; 301/37 R; 428/402
[58] Field of Search ...................... 350/97, 98, 99, 104, 350/105, 106, 107, 108, 109; 301/37 R; 428/402, 403, 406, 402.24

[56] References Cited

U.S. PATENT DOCUMENTS

| | | | |
|---|---|---|---|
| 2,407,680 | 9/1946 | Palmquist et al. | 88/82 |
| 2,948,191 | 8/1960 | Hodgson et al. | 350/105 |
| 3,005,382 | 10/1961 | Weber | 88/82 |
| 3,700,305 | 10/1972 | Bingham | 350/105 |
| 3,834,765 | 9/1974 | Trimble | 301/37 R |
| 3,934,065 | 1/1976 | Tung | 428/241 |
| 4,285,573 | 8/1981 | Stone | 350/99 |
| 4,293,189 | 10/1981 | Morikawa | 350/105 |
| 4,377,988 | 3/1983 | Tung et al. | 119/106 |

FOREIGN PATENT DOCUMENTS

| | | | |
|---|---|---|---|
| 0094700 | 11/1983 | European Pat. Off. | |
| 2750200 | 5/1979 | Fed. Rep. of Germany | |
| 203003 | 3/1966 | Sweden | 350/105 |

*Primary Examiner*—Bruce Y. Arnold
*Assistant Examiner*—Ronald M. Kachmarik
*Attorney, Agent, or Firm*—Donald M. Sell; Walter N. Kirn; Peter Forrest

[57] ABSTRACT

A retroreflective tubing adapted to be intertwined among spokes of a wheel, comprising a core material, retroreflective microspheres attached to an outer surface of the core material, and a protective encapsulating material surrounding the microspheres. In a preferred embodiment, the cross section of the core material is U-shaped to maximize the retroreflective performance of the tubing, and the encapsulating material provides a multiplicity of sealed airspaces between the outer surface of the retroreflective microspheres and the inner surface of the encapsulating material.

12 Claims, 2 Drawing Sheets

SPOKED WHEEL REFLECTOR EMPLOYING ENCAPSULATED RETROREFLECTIVE TUBING

TECHNICAL FIELD

This invention relates to safety devices for spoked wheels, specifically those employing retroreflective materials to improve the visibility of bicycle wheels and thereby improve recognition of the bicycle at night.

BACKGROUND

Retroreflective materials are widely used in a variety of situations involving vehicle and pedestrian traffic. Retroreflective materials promote safety by improving the visibility of objects illuminated by vehicle headlights or other sources of light. In one such application, the circumference of both of the spoked wheels or tires of a bicycle are retroreflective. The retroreflected image of two circles separated by a fixed distance is quite recognizable as a bicycle, even if the other portions of the bicycle are not retroreflective. Unless viewed perpendicularly to the wheel, the circles are seen as ellipses, but the image is still recognizable as a bicycle.

Bicycle tires with retroreflective sidewalls are more expensive than conventional tires, and require replacement of existing non-retroreflective tires. Accordingly, products suitable for addition to bicycles with conventional tires have been developed. Objects which may be added to existing bicycles to create a circular image include those taught by U.S. Pat. Nos. 3,834,765 (Trimble) and 4,285,573 (Stone); European Patent Office Publications 0 003 498 (Trimble) and 0 094 700 (Oskam); and German Offenlegungsschrift 27 50 200.

Retroreflective materials generally have confined angularity, i.e., they brightly reflect light only within a narrow range of solid angles around a ray of incoming light. In many applications this is not a serious disadvantage, because the retroreflective material may be designed and placed so that the intended observers are always within the preferred narrow angular range. For example, many retroreflective materials are designed to retroreflect rays which lie very nearly on the line normal to the surface of the material. Traffic signs made with such materials may be placed to retroreflect light to the known positions of vehicles on a roadway. Bicycles, by contrast, may be traveling in a variety of directions when in the field of view of an observer. Thus, the circular image should be visible from all angles, including directly ahead of and behind the bicycle. The shapes of bicycle reflectors have been designed to complement the properties of retroreflective materials and thereby improve the visibility of the reflectors from all angles.

For example, U.S. Pat. No. 3,834,765 (Trimble) teaches an elongated tubular member which is intertwined among the spokes of the wheel. The curved outer surface of the member ensures that light coming from substantially any direction will strike some portion of the reflective surface within the most efficient angular range of the reflective material.

DISCLOSURE OF INVENTION

The invention is a retroreflective tubing adapted to be intertwined among spokes of a wheel, comprising a core material, a retroreflective material comprising glass microspheres attached to an outer surface of the core material, and an encapsulating material providing a space between the retroreflective material and the inner surface of the encapsulating material.

DETAILED DESCRIPTION

Figure 1:
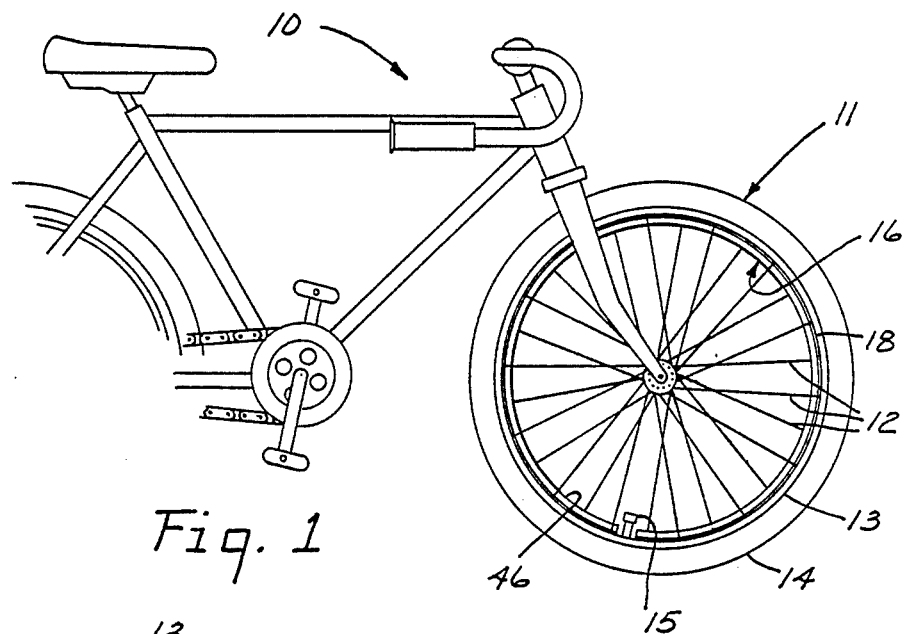
FIG. 1 is a side view of an embodiment of the invention as applied near the rim of a bicycle wheel.

As shown in FIG. 1, a bicycle 10 has a wheel 11. Wheel 11 comprises a plurality of spokes 12, rim 13, tire 14, and valve stem 15. An embodiment of the inventive retroreflective tubing 16 is intertwined among the spokes 12.

Figure 2:
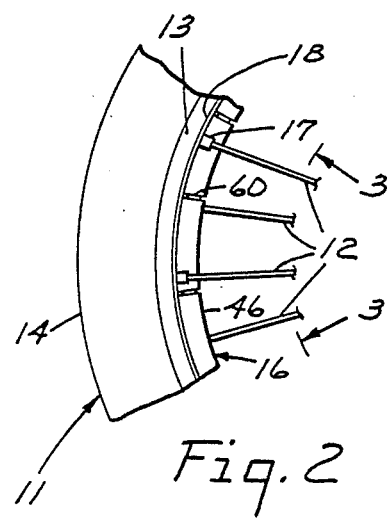
FIG. 2 is an enlarged view of a portion of the bicycle wheel of FIG. 1.
Figure 3:
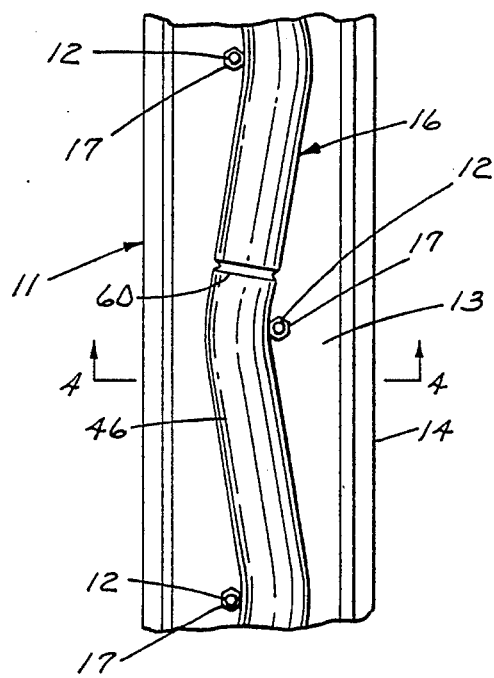
FIG. 3 is an enlarged top view taken along line 3—3 of FIG. 2.

A practical consideration in such an elongated tubular design is the placement of the reflector with respect to the spokes 12 and rim 13. For improved visibility, it is preferred to locate the retroreflective tubing 16 as near the inner circumference of rim 13 as possible, preferably in direct contact, as shown in FIG. 1. By so locating the reflector, the retroreflected image will be more uniformly circular when viewed from the side of the wheel, and have a larger circumference, both of which improve visibility. As shown in FIGS. 2 and 3, at the innermost surface of rim 13, it is necessary to bend the tubing 16 in a slalom-like manner among the spokes.

In the embodiment shown, the tension created by intertwining tubing 16 among spokes 12 and/or spoke nipples 17 holds tubing 16 in place. This embodiment requires materials flexible enough to allow the tubing to be woven among the spokes as shown. Optionally, the tubing 16 may, but need not, be adhered to rim 13 with external adhesive 18. This also helps maintain tubing 16 in place against rim 13, and additionally may deter theft of the tubing.

Figure 4:
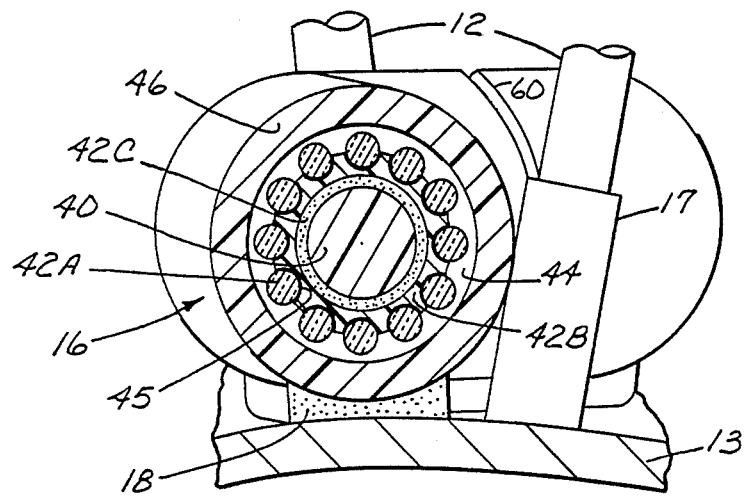
FIG. 4 is a cross-sectional view taken along line 4—4 of FIG. 3.

FIG. 4 shows tubing 16 in cross section. Retroreflective tubing 16 comprises core material 40; glass microspheres 42A, backed by reflective material 45 and embedded in bond material 42B; internal adhesive 42C, which adheres bond material 42B to core material 40; and encapsulating material 46. In the preferred embodiment shown, the outer radius of the layer of glass microspheres 42A is less than the inner radius of encapsulating material 46, thereby providing an airspace 44.

In the embodiment shown in FIG. 4, the cross sections of both the core material 40 and the encapsulating material 46 are circular, but this is not required. In general, the cross section of core material 40 should be such that the retroreflective material will operate efficiently in as large an angular range around the bicycle as possible. Preferably, at least some portion of the core material should be curved away from the inner surface of rim 13. Thus, at least some retroreflective material will be preferentially directed to incidence angles away from the directions perpendicular to the wheel. Furthermore, the cross sections of the encapsulating material and the core material need not be the same.

Suitable materials for core material 40 include semi-rigid plastics which will resist excessive distortion or bending, thereby maintaining the circular shape along the inner circumference of rim 13. Polyolefins, polyvinylchlorides, and nylons are preferred materials. A standard extrusion process is suitable for the manufacture of core material 40. The core material may be solid, as shown in FIG. 4, but a hollow construction is preferred to reduce material amount and weight of the final product.

The preferred glass microspheres 42A have high refractive index, typically about 1.9. To assemble the microspheres 42A into the bond layer 42B, a procedure such as that taught in U.S. Pat. No. 4,377,988 (Tung, et al.) is employed. The microspheres are first coated in a monolayer on a carrier web such as polyethylene coated paper. Heating the carrier web causes the microspheres to sink partially into the polyethylene, preferably to a depth of about 20 to 50 percent of the diameters of the microspheres. Then the exposed surfaces of the microspheres are covered with a reflective material 45, such as aluminum or silver by vapor deposition, silver by chemical deposition, or dielectric mirrors or coatings as taught in U.S. Pat. No. 3,700,305 (Bingham).

A bonding layer 42B, which is preferably a butyl rubber resin or alkyd resin, is applied over the reflective microspheres. Thus, the microspheres 42A are supported within the bonding layer 42B to a depth of about 50 to 80 percent of their diameters. The internal adhesive 42C is applied to the side of the bonding layer 42B opposite the microspheres. A release liner may be used to protect the exposed adhesive. If the bonding layer 42B is added to core material 40 after the latter is cooled from the extrusion process, a suitable internal adhesive 42C is an acrylate adhesive such as type Y9469 available from the Minnesota Mining and Manufacturing Company. If bonding layer 42B is added immediately after extrusion of core material 40, adhesive 42C is preferably a polyurethane-based product such as type 5713 available from the B.F. Goodrich Company.

The carrier web may be removed before or after the internal adhesive 42C is applied to the core material, exposing the surfaces of the microspheres 42A. If a release liner was used to protect the exposed internal adhesive, it is removed before the internal adhesive is applied to the core material. The result is a tubing which is substantially covered by a retroreflective layer.

A factor affecting performance of the retroreflective microspheres 42A is whether they are in contact with water or air, which differ in their indices of refraction. The preferred glass microspheres 42A have index of refraction between about 1.8 and 2.0, and are designed to refract light which has passed through air immediately before entering the microspheres. However, traffic safety devices such as the present invention are exposed to a variety of weather conditions, including rain. Because the indices of refraction of air and water are different (1.0 and 1.33, respectively), the retroreflective performance of the microspheres is affected significantly when they are wet. Thus, in the preferred embodiment, an airspace 44 helps ensure that the glass microspheres 42A will function as designed even when the outermost surface of the encapsulating material 46 is wet.

The encapsulating material 46 may be colorless or colored if desired, but must be transparent to the visible light of vehicle headlights. Like the core material 40, the encapsulating material 46 should resist excessive distortion or bending, so that tubing 16 will maintain the preferred shape and location against rim 13. Additionally, encapsulating material 46 should be abrasion resistant. Suitable materials include: (1) polyurethanes, such as type 58810 available from the B.F. Goodrich Company; (2) polymers of ethylene acrylic acids; or (3) thermoplastic materials produced from ionomer resins, such as "SURLYN" type 9910 available from the E.I. DuPont de Nemours Company. Polyvinylchlorides are also suitable but are not as resistant to abrasion.

Standard extrusion techniques are suitable for the manufacture of encapsulating material 46. A preferred process employs an extrusion die with a circular center hole, through which the previously made microsphere-coated core material 40 passes. The center hole of the die is surrounded by a concentric annular hole through which the encapsulating material 46 is extruded. The circular and annular holes are separated by a radial amount sufficient to provide the airspace 44 in the final extruded construction.

External adhesive 18, if used, preferably comprises a thin foam coated on both sides with pressure sensitive adhesives. An acceptable material is type 4032, available from the Minnesota Mining and Manufacturing Company. In general, the external adhesive 18 must adhere strongly to both the encapsulating material 46 and typical wheel rims. In the case of adhesion to the encapsulating material, the preferred process removes lengths of external adhesive, cut to proper width, from rolls and laminates them onto continuous lengths of tubing.

Some means for maintaining the airspace should be provided, to prevent water and other contaminants from entering at the ends of the tubing. For example, U.S. Pat. No. 3,834,765 (Trimble), at Column 3, lines 15-20 teaches the use of a plug or sleeve to connect ends of tubing, but does not suggest that the plug or sleeve could also seal the tubing. Such a plug or sleeve is suitable for hermetically sealing the inventive tubing, however, if manufactured to fit tightly in each end.

Additionally, but not required, the plug or sleeve could incorporate a hole designed to fit around the valve stem. This is appropriate if the tubing is placed on the wheel so that the ends meet near the valve stem, as shown in FIG. 1. The fitted plug or sleeve then helps keep the tubing in place around the wheel rim. If a hole is not provided in the plug or sleeve, the ends of the tubing may meet at any convenient location around the wheel. The plug or sleeve may also be retroreflective, but need not be.

Figure 6:
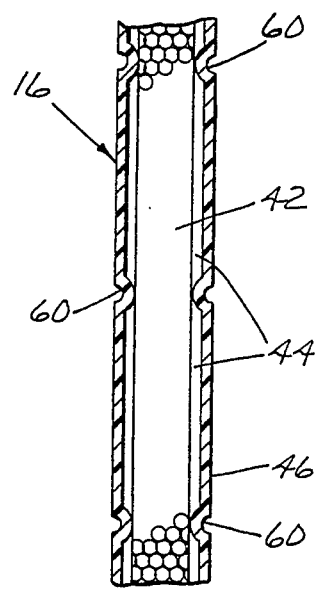
FIG. 6 is a partial sectional side view of the embodiment of FIG. 4.

For the present invention, the airspace is preferably maintained by hermetically sealing the encapsulating material to the layer of microspheres or core material. FIG. 6 shows partial sectional side view of tubing 16 of FIG. 4, with only the encapsulating material shown in cross section, and no external adhesive provided. The encapsulating material 46 may be sealed in any manner which fully surrounds the tubing in a substantially circumferential path, as accomplished for example by the circular seals 60.

There must be at least two seals present after the tubing is cut to a suitable length, so that there will be at least one hermetically sealed section of tubing between the seals. Preferably, each of the minimum two seals will be as close to an opposite end of the cut length as possible, to maximize the amount of hermetically sealed retroreflective material. For a manufacturing process which produces continuously extruded tubing, this preference implies two closely positioned seals between which a cut must be accurately placed. Such close tolerance cutting is not desired in mass production processes. Thus, in the preferred embodiment, a multiplicity of somewhat regularly and closely spaced seals is provided, which allows for less precision in the locations of the cuts. Furthermore, should the encapsulating layer be damaged at a particular location between two closely spaced seals, water and contaminants are less likely to affect the retroreflective performance of the entire length of tubing.

The seals may be created immediately after extruding encapsulating material 46 around the retroreflective core as described above. For example, seals 60 may be formed while encapsulating material 46 is still in a semifluid state by directly crimping the encapsulating material onto the microsphere-covered core tubing. Once the heat and/or pressure of forming are removed, e.g., by quenching in water, the crimped encapsulating material holds fast to the layer of microspheres in the crimped, sealed shape, as shown in FIG. 6.

The sealing method may affect the choice of preferred materials. For example, in process of producing the crimped, thermally formed seal of FIG. 6, the freely-flowing encapsulating material 46 tends to surround the microspheres and thus also directly contact bond layer 42B. Therefore, compatibility of the encapsulating and bond materials should be considered. If either DuPont "SURLYN" type 9910 resin or a polymer of ethylene acrylic acid is used for encapsulating material 46, a compatible bond layer 42B is a polymer or ethylene acrylic acid designated by DuPont as "EL-VAX" type 5950. If a polyvinlychloride (such as type 2222C available from Alpha Chemical and Plastics Company) is used, a suitable bond layer 42A is a mixture of 83.5 percent (by weight) polyurethane resin and 16.5 percent melamine formaldehyde polymer.

EXAMPLE 1

Two suitable lengths of tubing were constructed to compare the performance of a construction employing retroreflective microspheres (Sample A) with that of a construction employing a flexible cube-corner retroreflective material (Sample B).

A conventionally extruded core material of hollow 5 mm diameter polyethylene was used in each sample. In Sample A, the embodiment of FIG. 4 was used, and thus the core material 40 was coated with a layer of 65 micron diameter (average) glass microspheres 42A with a refractive index of 1.9. In sample B, a type of flexible cube-corner retroreflective material, available commercially from Reflexite Corporation and designated as 147-1564 by that company, was used in lieu of a sheeting of retroreflective microspheres.

To construct the retroreflective layer of Sample A, a flexible, adhesive-backed retroreflective material was created and wrapped around the core material. The glass microspheres 42A were coated in a monolayer on a carrier web of polyethylene coated paper and heated to sink partially into the polyethylene. The exposed surfaces of the microspheres were then covered first by vapor deposited aluminum layer 45, and next with bonding layer 42B. Bonding layer 42B was a mixture comprising (by weight) 55 percent of a high-acrylonitrile acrylonitrile-butadiene rubber ("HYCAR" 1001 supplied by B.F. Goodrich Company), 35 percent of a thermosetting penolic resin ("DUREZ" type 175 supplied by Hooker Chemical Corporation), and 10 percent of dioctylphthalate as a plasticizer. On the bonding layer 42B, type M41 aggressive acrylate PSA, available from the Minnesota Mining and Manufacturing Company, was applied to serve as internal adhesive 42C. Next, the carrier web was removed, leaving a layer of reflective microspheres embedded in one side of bonding layer 42B. Then the microsphere-embedded bonding layer 42B was adhered to the core material 40 by wrapping the combination around the core layer and applying pressure.

To construct the retroreflective layer of Sample B, the flexible cube-corner material was simply wrapped around the core material. No analogue of internal adhesive 42C was used, as the encapsulating layer (described below) sufficiently held the flexible sheeting in place.

Each sample was concentrically encapsulated with a layer of 0.38 mm thick ionomer resin, "SURLYN" type 9910 available from E.I. DuPont de Nemours Company. No hermetic seals between sections of tubing were created in either sample.

Retroreflective measurements were made using standard calibrated equipment designed to measure the retroreflected brightness of visible light striking the samples at 4 degrees incidence angle and 0.2 degrees observation angle. The measured brightness of the average of 12 measurements for Sample A was approximately three times greater than that of the average of 12 measurements for Sample B.

Figure 5:
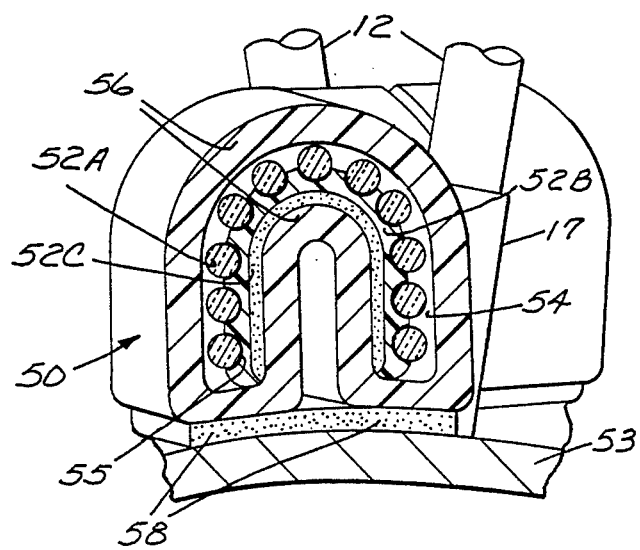
FIG. 5 is a cross-sectional view of another embodiment of the invention.

FIG. 5 is a cross-sectional view of another embodiment of the invention. Retroreflective tubing 50 comprises a core material 56, glass microspheres 52A, bond material 52B, support layer 52C, and specular reflectors 55. Because of the substantially "U-shaped" cross section of this embodiment, the core material 56 also serves to encapsulate the retroreflective glass microspheres 52A, thereby providing an airspace 54. Tubing 50 is attached to rim 53 by external adhesive 58.

To produce tubing 50 in a continuous extrusion process, it is preferable to construct the layer of embedded retroreflective microspheres on support layer 52C as a separate step, prior to the extrusion of the U-shaped core material 56 around support layer 52C. A common heavyweight paper is a suitable material for support layer 52C, because it adheres well to the preferred bond materials and thermally sets into the preferred core materials In other respects, the preferred materials for this embodiment are the same as for analogous members of the embodiment of FIG. 4.

The embodiment of FIG. 5 is preferred because the retroreflective material is used efficiently, and the amount of retroreflective material is decreased. The two substantially flat side portions of the U-shaped configuration exploit the abilitY of the microspheres to retroreflect light of fairly large incidence angle. These portions thus operate much like the flat sheetings known in the art. The curved portion presents at least some retroreflective material to substantially all directions between perpendicular to the wheel and the direction of travel. Thus, the retroreflected image is visible from a greater range of directions around the bicycle. Also, the U-shape reduces the amounts of materials required, because the portion of the tubing facing the rim does not have microspheres, bonding layer, or internal adhesive.

The previously described embodiments provide for an airspace between the encapsulating layer and the glass microspheres. This encapsulated "exposed-lens" construction is dictated by the optical design of the microspheres chosen for the embodiments, specifically the refractive index of approximately 1.8 to 2.0. Some retroreflective materials employ microspheres with a higher index, and do not require an air interface on the light-incident side of the microspheres. For example, U.S. Pat. No. 2,407,680 (Palmquist et al.) teaches a retroreflective material comprising a monolayer of microspheres embedded in a transparent polymeric sheet. The specularly reflective component of this material is not in direct contact with the microspheres, as in the embodiments described previously. Rather, the specular reflector is displaced somewhat away from the microspheres, at a distance suitable for desired retroreflective rays. A layer of such a material could be adhered to a core material in either the circular or substantially U-shaped cross section embodiments of FIGS. 4 and 5, respectively. An external adhesive as described above may also be used. However, use of microspheres with index of refraction above 2.0 is not as preferred, because these microspheres are known to have less retroreflective intensity than the preferred exposed-lens microspheres of 1.9 index.

Figure 7:
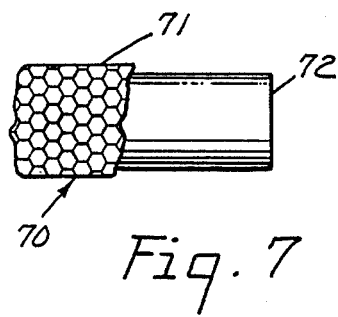
FIG. 7 is a side view of another embodiment of the invention, with the retroreflective sheeting 71 partially stripped away.

Prefabricated, flexible retroreflective sheetings may be employed to construct other embodiments of the invention. In general, suitable sheetings comprise an adhesive layer (for application to a support), a polymeric base layer, some type of retroreflective material attached to the base layer, and a transparent cover laYer to protect the retroreflective material. FIG. 7 shows an embodiment of retroreflective tubing 70 in which a flexible retroreflective sheeting 71 (such as is commercially available from Minnesota Mining and Manufacturing Company as "SCOTCHLITE" brand reflective sheeting, High Intensity Flexible 3810) is wrapped around a polyethylene core tubing 72. The sheeting 71 adheres to the core material 72 due to the pressure sensitive adhesive provided on the back of the sheeting. The retroreflective sheeting 71 has a transparent cover layer which provides "cells" of airspaces between the cover layer and the retroreflective material, as taught in U.S. Pat. No. 4,025,159 (McGrath). Thus, the transparent cover layer serves the same role in tubing 70 as does encapsulating material 46 in the embodiment shown in FIG. 4. Either a circular or substantially U-shaped cross section embodiment may be employed, as may an external adhesive.

While certain representative embodiments and details have been shown to illustrate this invention, it will be apparent to those skilled in this art that various changes and modifications may be made in this invention without departing from its full scope, which is indicated by the following claims.

We claim:

1. A retroreflective tubing, comprising a core material, a retroreflective material comprising glass microspheres attached to an outer surface of the core material, and an encapsulating material providing an airspace between outer surfaces of the microspheres and the inner surface of the encapsulating material; the tubing being sufficiently flexible to be intertwined among spokes of a wheel and to assume a portion of the circular shape of the wheel.

2. The retroreflective tubing of claim 1 further comprising means for maintaining the space between the retroreflective material and the inner surface of the encapsulating material.

3. The retroreflective tubing of claim 2 in which the means for maintaining the space between the retroreflective material and the inner surface of the encapsulating material comprises at least two seals between ends of the tubing.

4. The retroreflective tubing of claim 3 in which a multiplicity of regularly spaced seals maintains multiple spaces between the retroreflective material and the inner surface of the encapsulating material.

5. The retroreflective tubing of claim 1 in which the tubing has a circular cross section.

6. The retroreflective tubing of claim 1 in which the tubing has a substantially "U-shaped" cross section.

7. The retroreflective tubing of claim 1 further comprising an adhesive located on the outermost surface of the tubing.

8. A retroreflective tubing, comprising
   a core material, and
   a retroreflective material attached to an outer surface of the core material, comprising
      a monolayer of microspheres embedded in a transparent polymeric sheet, and
      specular reflectors not in contact with the microspheres;
   the tubing being sufficiently flexible to be intertwined among spokes of a wheel and to assume a portion of the circular shape of the wheel.

9. A retroreflective tubing, comprising
   a core material, and
   a flexible retroreflective sheeting material comprising
      an adhesive layer,
      a base layer,
      glass microspheres attached to the base layer, and
      a transparent cover layer attached to the base layer providing airspaces between the cover layer and the microspheres,
   in which the sheeting material is adhered to an outer surface of the core material by the adhesive layer;
   The tubing being sufficiently flexible to be intertwined among spokes of a wheel and to assume a portion of the circular shape of the wheel.

10. The combination of a spoked wheel and a retroreflective tubing, in which the tubing comprises a core material, a retroreflective material comprising glass microspheres attached to an outer surface of the core material, and an encapsulating material providing an airspace between outer surfaces of the microspheres and the inner surface of the encapsulating material; the tubing being intertwined among the spokes of the wheel and assuming a portion of the circular shape of the wheel.

11. The combination of a spoked wheel and a retroreflective tubing, in which the tubing comprises
   a core material, and
   a retroreflective material attached to an outer surface of the core material, comprising
      a monolayer of microspheres embedded in a transparent polymeric sheet, and
      specular reflectors not in contact with the microspheres;
   the tubing being intertwined among spokes of the wheel and assuming a portion of the circular shape of the wheel.

12. The combination of a spoked wheel and a retroreflective tubing, in which the tubing comprises
   a core material, and a flexible retroreflective sheeting material comprising an adhesive layer, a base layer, glass microspheres attached to the base layer and a transparent cover layer attached to the base layer providing airspaces between the cover layer and the microspheres, in which the sheeting material is adhered to an outer surface of the core material by the adhesive layer; the tubing being intertwined among the spokes of the wheel and assuming a portion of the circular shape of the wheel.

* * * * *